(12) United States Patent
Gallagher et al.

(10) Patent No.: US 6,275,605 B1
(45) Date of Patent: Aug. 14, 2001

(54) METHOD FOR ADJUSTING THE TONE SCALE OF A DIGITAL IMAGE

(75) Inventors: Andrew C. Gallagher; Edward B. Gindele, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/232,537

(22) Filed: Jan. 18, 1999

(51) Int. Cl.$^7$ .................................................. G06K 9/00
(52) U.S. Cl. ............................................ 382/162; 382/167
(58) Field of Search .................................. 382/162, 163, 382/164, 165, 166, 167, 168, 169; 358/80, 214

(56) References Cited

U.S. PATENT DOCUMENTS

| | | | |
|---|---|---|---|
| 5,012,333 | * 4/1991 | Lee et al. ................................. | 358/80 |
| 5,060,061 | * 10/1991 | Shishido et al. ........................ | 358/80 |
| 5,164,993 | * 11/1992 | Capozzi et al. ......................... | 382/6 |
| 5,454,044 | 9/1995 | Nakajima ............................... | 382/132 |
| 5,633,511 | * 5/1997 | Lee et al. ............................... | 382/132 |

\* cited by examiner

*Primary Examiner*—Phuoc Tran
*Assistant Examiner*—Amir Alavi
(74) *Attorney, Agent, or Firm*—David M. Woods

(57) ABSTRACT

A method for adjusting tone scale of a digital image, the method comprises the step of receiving a digital image channel from the digital image; providing a tone scale function for adjusting the tone scale of the digital image channel; calculating a difference signal derived from the digital image channel and the tone scale function; calculating a compensation signal derived from a filtered version of the difference signal; and combining the digital image channel and the compensation signal to generate a modified digital image channel.

42 Claims, 7 Drawing Sheets

METHOD FOR ADJUSTING THE TONE SCALE OF A DIGITAL IMAGE

CROSS-REFERENCE TO RELATED APPLICATIONS

The present application is related to U. S. application Ser. No. 09/091,848, filed Sep. 30, 1998, by Andrew Gallagher, and entitled, "A METHOD FOR PRESERVING IMAGE DETAIL WHEN ADJUSTING THE CONTRAST OF A DIGITAL IMAGE".

FIELD OF THE INVENTION

The invention relates generally to the field of digital image processing and, more particularly, to a method for adjusting the tone scale of a digital image.

BACKGROUND OF THE INVENTION

Existing methods for applying tone scales to digital color images include applying the tone scale to each of the color channels independently, applying the tone scale to the neutral channel and preserving the original pixel color difference signal, or applying the tone scale to just the low frequency image. These methods of tone scale application alter the sharpness and appearance of the color in processed images, and the latter can produce displeasing artifacts.

Traditional methods of applying a tone scale function to a digital color image modify the apparent sharpness of the image because the tone scale modifies the amplitudes of high frequency detail information. This phenomenon occurs when the tone scale function is applied to each of the color channels independently, or when the tone scale function is applied to the neutral channel and original pixel color difference signals are preserved.

In an effort to apply a tone scale function to a digital image without distorting the detail information, in U.S. Pat. No. 5,012,333, Lee et al. proposed separating the image into a high frequency and a low frequency image by using FIR filters. The tone scale function is then applied to only the low frequency image, and the high frequency image is added back to the tone scaled low frequency image.

Also, in U.S. Pat. No. 5,454,044, Nakajima suggests modifying the image contrast by the formula $$Sproc = Sorg + f(Sus).$$

The low frequency image (Sus) is passed through function f( ) which is a monotonically decreasing function. This signal is added to the original (Sorg) to create the processed image Sproc.

Both of these methods preserve the high frequencies of the image, but both may lead to the creation of unsharp mask type artifacts (overshoot and undershoot) in the neighborhood of large edges (characteristic of occlusion boundaries or dark shadows).

Although the presently known and used methods for adjusting the tone scale of a digital image are satisfactory, they include the above-described drawbacks. The present invention permits the application of a tone scale function to a digital image which adjusts the macro contrast of the image, preserves the high frequency detail information, and prevents artifacts in the neighborhood of large edges.

SUMMARY OF THE INVENTION

The present invention is directed to overcoming one or more of the problems set forth above. Briefly summarized, according to one aspect of the present invention, the invention resides in a method for adjusting tone scale of a digital image, the method comprising: (a) receiving a digital image channel from the digital image; (b) providing a tone scale function for adjusting the tone scale of the digital image channel; (c) calculating a difference signal derived from the digital image channel and the tone scale function; (d) calculating a compensation signal derived from a filtered version of the difference signal; and (e) combining the digital image channel and the compensation signal to generate a modified digital image channel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of permitting the application of a tone scale function to a digital image that adjusts the macro contrast of the image, while preserving the spatial frequency detail information, without introducing artifacts in the neighborhood of large transitions.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, a computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

It is also instructive to note that the present invention will utilize a digital image of size 1024 pixels by 1536 pixels, although those skilled in the art will recognize that digital images of different dimensions may be used with equal success.

Figure 1:
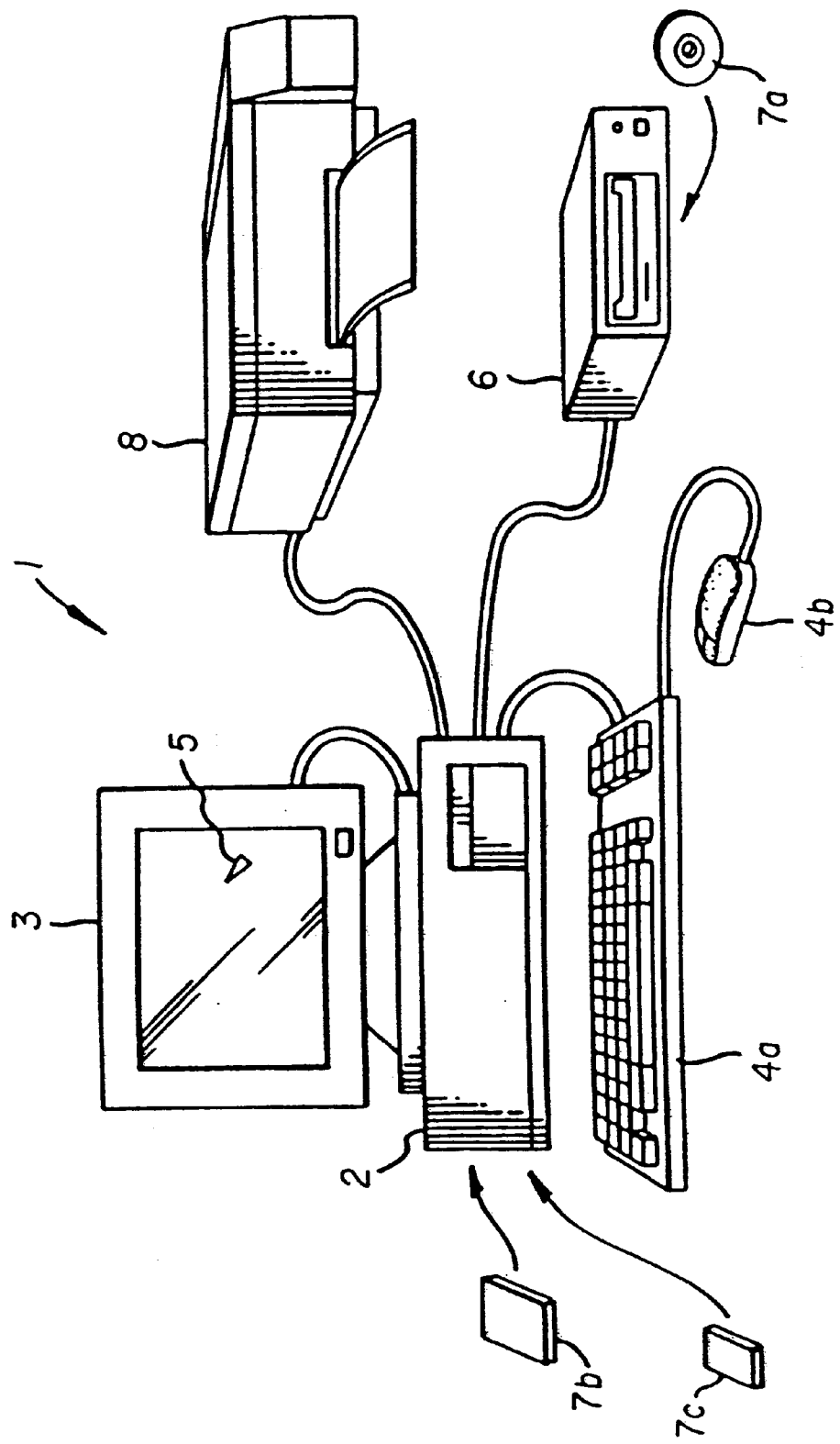
FIG. 1 is a perspective view of a computer system for implementing the present invention.

Referring to FIG. 1, there is illustrated a computer system 1 for implementing the present invention. Although the computer system 1 is shown for the purpose of illustrating a preferred embodiment, the present invention is not limited to the computer system 1 shown, but may be used on any electronic processing system. The computer system 1 includes a microprocessor-based unit 2 for receiving and processing software programs and for performing other processing functions. A display 3 is electrically connected to the microprocessor-based unit 2 for displaying user-related information associated with the software. A keyboard 4a is also connected to the microprocessor based unit 2 for permitting a user to input information to the software. As an alternative to using the keyboard 4a for input, a mouse 4b may be used for moving a selector 5 on the display 3 and for selecting an item on which the selector 5 overlays, as is well known in the art.

A compact disk-read only memory (CD-ROM) 6 is connected to the microprocessor based unit 2 for receiving software programs and for providing a means of inputting the software programs and other information to the microprocessor based unit 2 via a compact disk 7a, which typically includes a software program. In addition, a floppy disk 7b may also include a software program, and is inserted into the microprocessor-based unit 2 for inputting the software program. Still further, the microprocessor-based unit 2 may be programmed, as is well know in the art, for storing the software program internally. A printer 8 is connected to the microprocessor-based unit 2 for printing a hardcopy of the output of the computer system 1.

Images may also be displayed on the display 3 via a personal computer card (PC card) 7c or, as it was formerly known, a personal computer memory card international association card (PCMCIA card) which contains digitized images electronically embodied in the card 7c. The PC card 7c is ultimately inserted into the microprocessor based unit 2 for permitting visual display of the image on the display 3.

Figure 2:
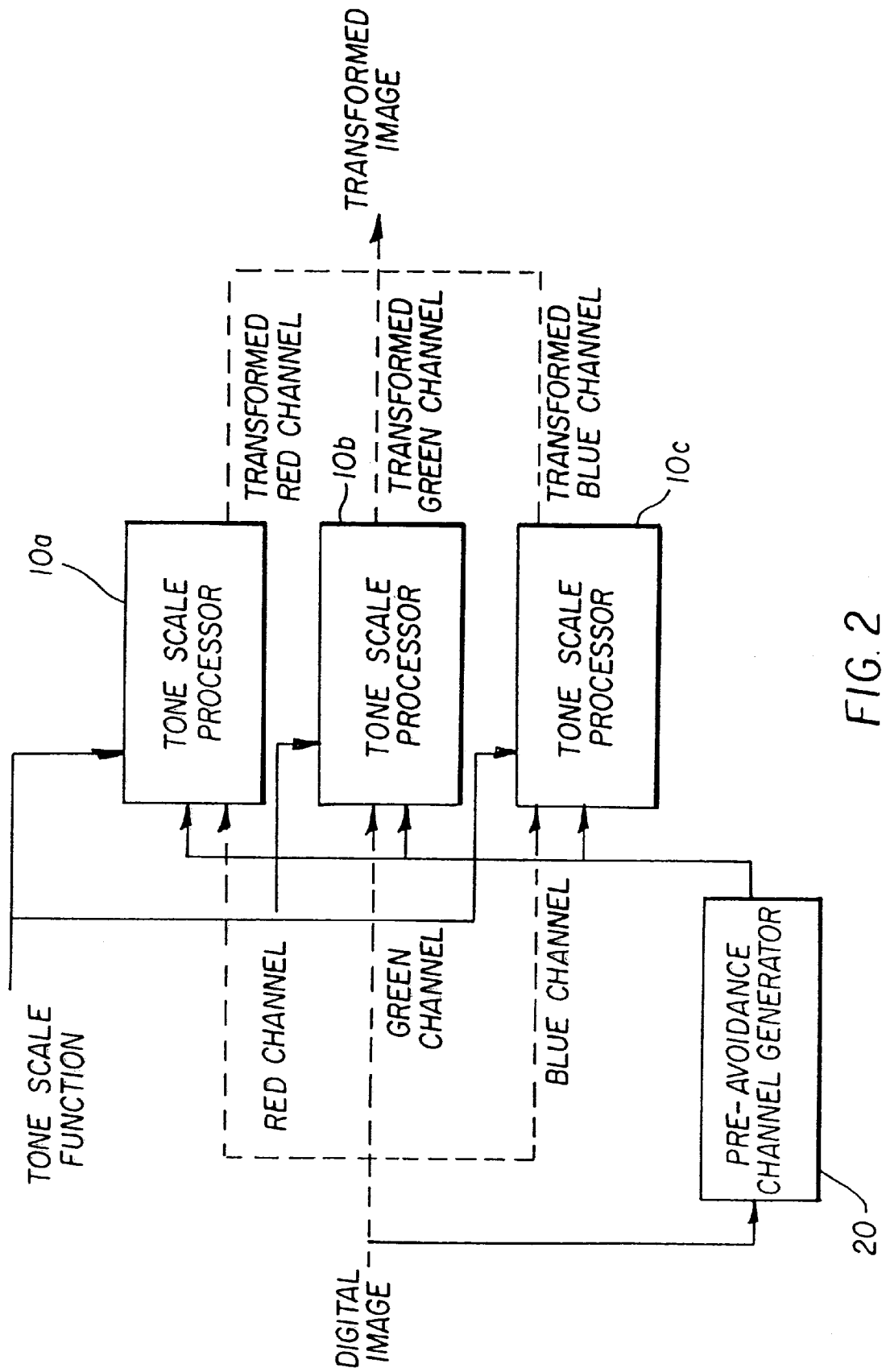
FIG. 2 is a block diagram of an overview of the present invention.

Referring to FIG. 2, there is illustrated an overview of the present invention. A digital representation of a digital image channel is passed as to a plurality of tone scale processors 10. It is instructive to note that the digital image typically includes three-color channels—red, green, and blue image channels (RGB), and that each color channel is passed to a different tone scale processor. For example, the red color channel is passed to the tone scale processor 10a. The digital image is also passed to a pre-avoidance channel generator 20, which generates a pre-avoidance channel that is also passed to each processor 10. In the preferred embodiment in which there are three color channels, the pre-avoidance channel for each of the tone scale processors 10 is equal to a linear combination of all the digital image channels representing the image. In this regard, the pre-avoidance channel is calculated as follows:

$$pac(x,y)=0.3\text{red}(x,y)+0.6\text{green}(x,y)+0.1\text{blue}(x,y) \quad \text{Eq. 1}$$

where pac(x,y) represents the intensity of the pre-avoidance channel at the $x^{th}$ $y^{th}$ pixel location, red(x,y) represents the intensity of the red channel at the $x^{th}$ $y^{th}$ pixel location, green(x,y) represents the intensity of the green channel at the $x^{th}$ $y^{th}$ pixel location, and blue(x,y) represents the intensity of the blue channel at the $x^{th}$ $y^{th}$ pixel location.

Those skilled in the art will recognize that different pre-avoidance channel signals may be used. As an alternative embodiment, the pre-avoidance channel may be equal to any one of the three color image channels of the digital image. As a further alternative embodiment, the pre-avoidance channel need not be equal for each of the tone scale processors 10a, 10b, and 10c.

The tone scale processors 10 also receive a desired tone scale function, and each processor 10 creates a transformed color image channel from the particular color channel value, the pre-avoidance channel, and the tone scale function. The tone scale functions received by each tone scale processor 10 may be identical, or alternatively, one or more tone scale functions received by each tone scale processor may be different from the remaining tone scale function(s). The three modified color-channel values form the pixel values of the transformed image.

Figure 3:
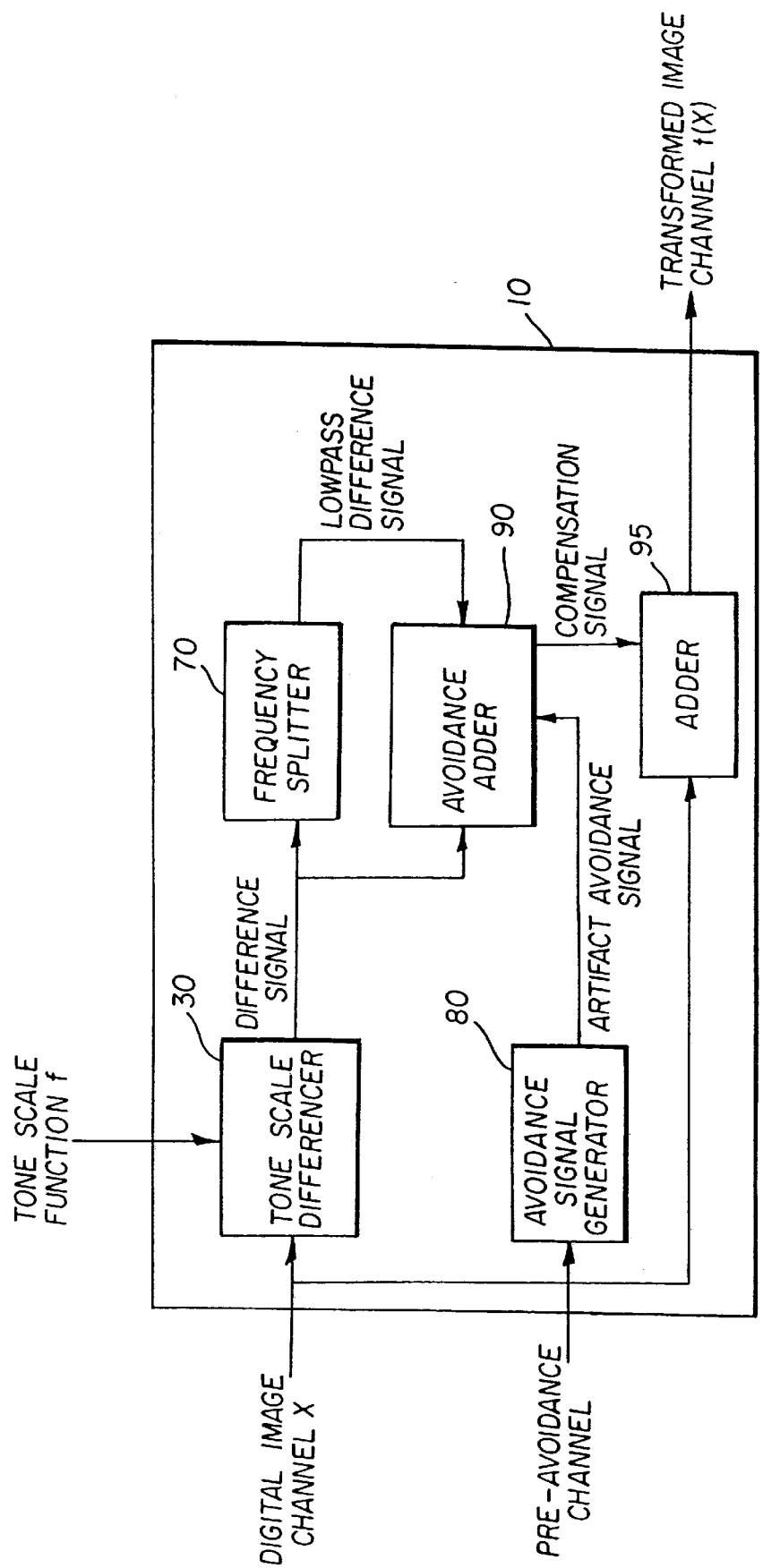
FIG. 3 is an exploded view of the tone scale processor of FIG. 1.

Referring to FIG. 3, there is illustrated an exploded block diagram of the tone scale processor 10. It facilitates understanding to note that only one color channel will be discussed for brevity, and that the same process is performed on each channel. A tone scale differencer 30 calculates the difference between the image channel modified by the tone scale function and the original image channel for producing a difference signal, as will be described in detail below. The difference signal is passed to a frequency splitter 70 which performs a spatial filtering operation on the difference signal for producing a lowpass difference signal.

The spatial filtering operation preformed by the frequency splitter 70 is preferably with a Finite Impulse Response (FIR) Gaussian filter having a width of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two-dimensional, circularly symmetric, lowpass filter whose filter coefficients may be derived by the following formula which is well known in the art:

$$G(i,j)=1(\text{sigma sqrt}(2\pi))\exp[-(i^2+j^2)/(2\text{sigma}^2)]$$

where
G(i,j)=the Gaussian filter coefficient at the (i, j)$^{th}$ pixel
Sigma=the standard deviation of the Gaussian filter (2.5)
π=the constant approximately 3.1415 . . .

Spatial filtering an image channel with a digital filter (referred to in the art as 2 dimensional convolution) is well known in the art and will not be further discussed herein. The lowpass signal is input into an avoidance adder 90 which combines the difference signal and lowpass difference signal in a weighted manner. The combined signal output from the avoidance adder 90 will be referred to as a compensation signal, as will be described in detail below.

The pre-avoidance channel pac(x,y) is input to the avoidance signal generator 80 for the purpose of controlling the weighted average of the lowpass difference signal and the difference signal. This controlling signal will be referred to as an avoidance signal (a); the generation of the avoidance signal (a) will also be described in detail below.

Still referring to FIG. 3, the avoidance signal is input to the avoidance adder 90 along with the lowpass difference signal and the difference signal output from the tone scale differencer 30. An avoidance adder 90 requires three inputs: 2 signals to be summed, and the artifact avoidance signal (a). The two signals to be summed undergo a transformation such that one of the signals to be summed is multiplied by (a), and the other is multiplied by (1−a). The two transformed signals are then added. The signal input which is scaled by (a) is known as the "(a) input" of the avoidance adder 90 and the signal input which is scaled by (1−a) is known as the "(1−a)" input of the avoidance adder 90. If S1 and S2 are the signals to be summed with an avoidance adder 90, the result of which is A, the foregoing may be reduced to an algebraic expression:

$$A = a(S1) + (1-a)(S2)$$

In the preferred embodiment, the lowpass difference signal output from the frequency splitter 70 is applied to the (a) input of the avoidance adder and the difference signal output from the tone scale differencer 30 is applied to the (1−a) input of the avoidance adder 90.

The compensation signal output from the avoidance adder 90 and the original digital image channel are passed to an adder 95. An adder 95 produces an image channel by summing the intensity values at each location of two or more input images. Analytically, $$Z(x,y) = X(x,y) + Y(x,y)$$

where $Z(x,y)$ represents an intensity value of the output image channel, and $X(x,y)$ and $Y(x,y)$ represent intensity values of input image channels. The use of an adder 95 is well known and will not be further discussed herein. The output of the adder 95 is a modified image channel. The modified image channel has a modified tone scale with respect to the original image.

Figure 4:
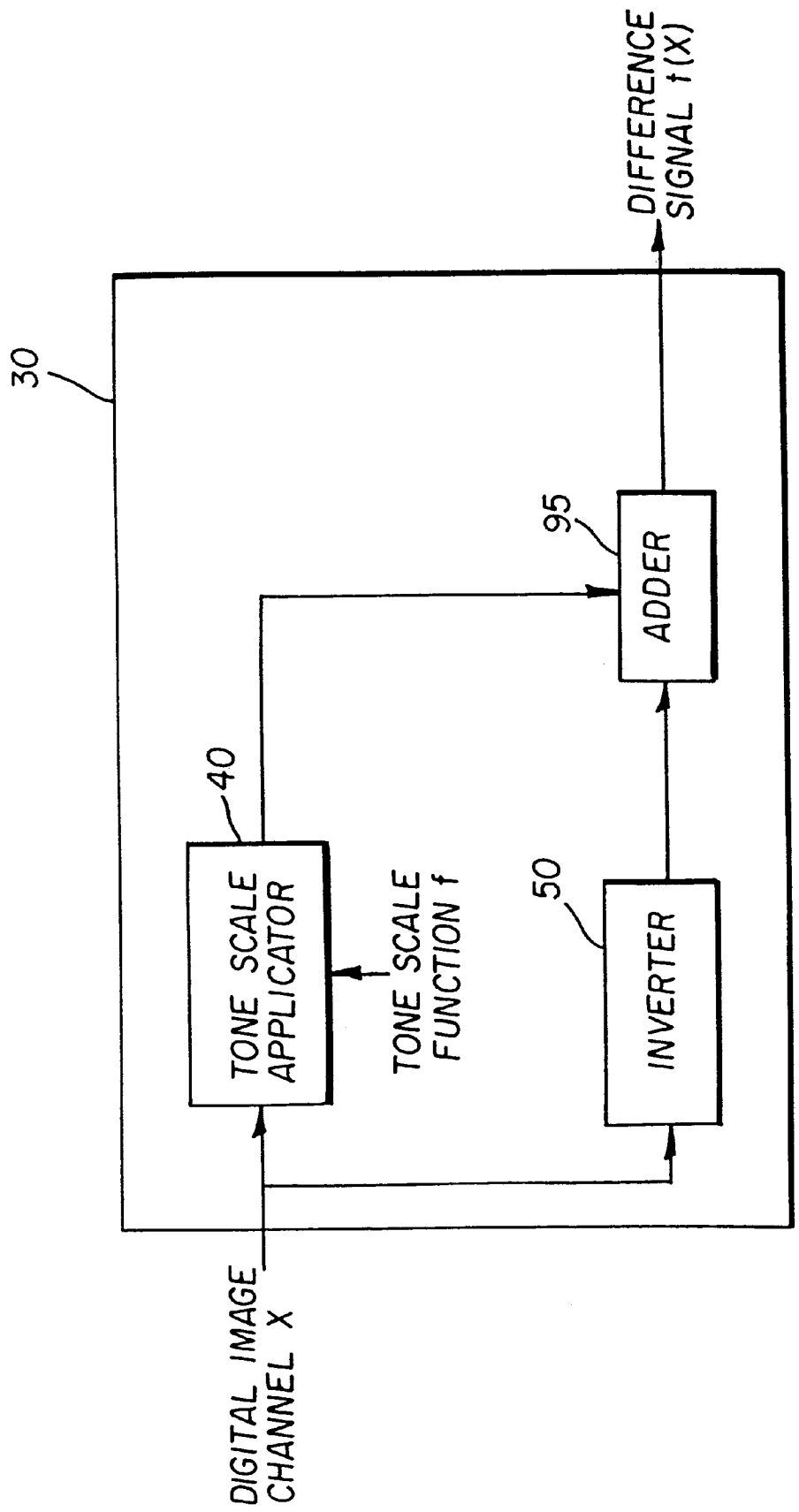
FIG. 4 is an exploded view of a portion of FIG. 3.
Figure 5:
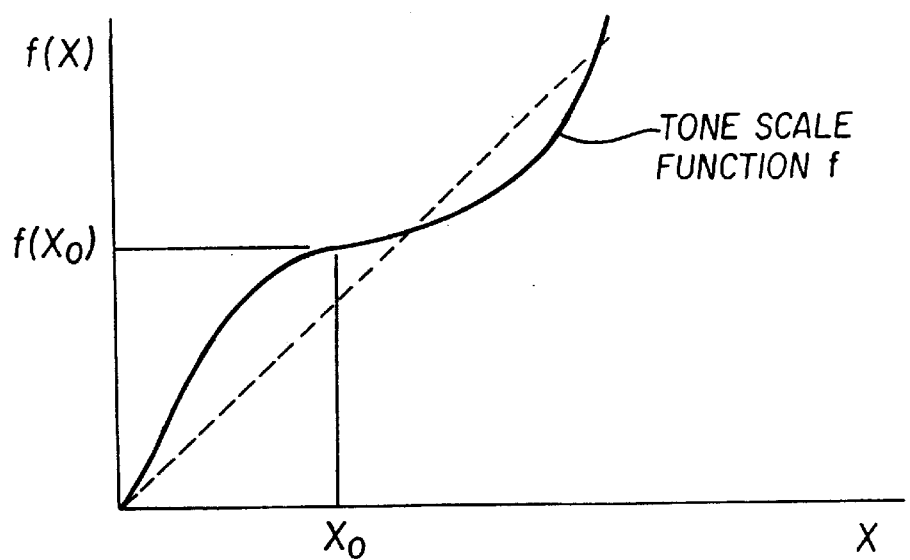
FIG. 5 is an illustration of a typical tone scale function.

Referring to FIG. 4 there is illustrated an exploded block diagram of the tone scale differencer 30. The digital image channel input to the tone scale differencer 30 is passed to a tone scale applicator 40. A tone scale function is applied to the input image channel by a tone scale applicator 40 in order to change the characteristics of the image for image enhancement. The tone scale function may be applied for the purposes of altering the relative brightness or contrast of the digital image. A tone scale applicator 40 is implemented by application of a look up table (LUT). Modification of a digital image channel by a LUT is well known in the art. A typical tone scale function that may be used in the present invention showing a 1 to 1 mapping of input values to output values is illustrated in FIG. 5. The digital image channel input to the tone scale differencer 30 is also passed to an inverter 50. The inverter 50 inverts the input signal by scaling the input by −1 to generate an inverted signal. The inverted signal is summed to the output of the tone scale applicator 40 by an adder 95 to generate a difference signal.

Figure 6:
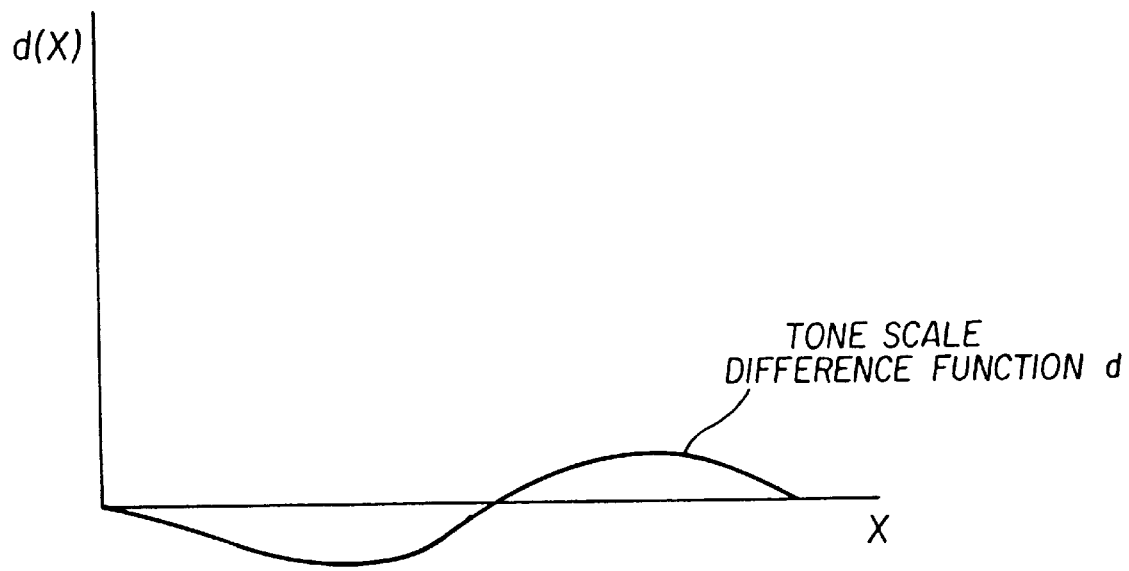
FIG. 6 is an illustration of a typical tone scale difference function.

In the preferred embodiment, the tone scale differencer 30 may be implemented as a single LUT, an example of which is shown in FIG. 6. The tone scale differencer 30 may be implemented by a LUT formed by evaluating the following equation:

$$d(x) = f(x) - x;$$

where $d(x)$ is the value of the LUT used to implement the tone scale differencer 30, $f(x)$ is the value of the tone scale function, and x is the intensity value to be transformed. The function $d(x)$ is an example of a difference function.

Figure 7:
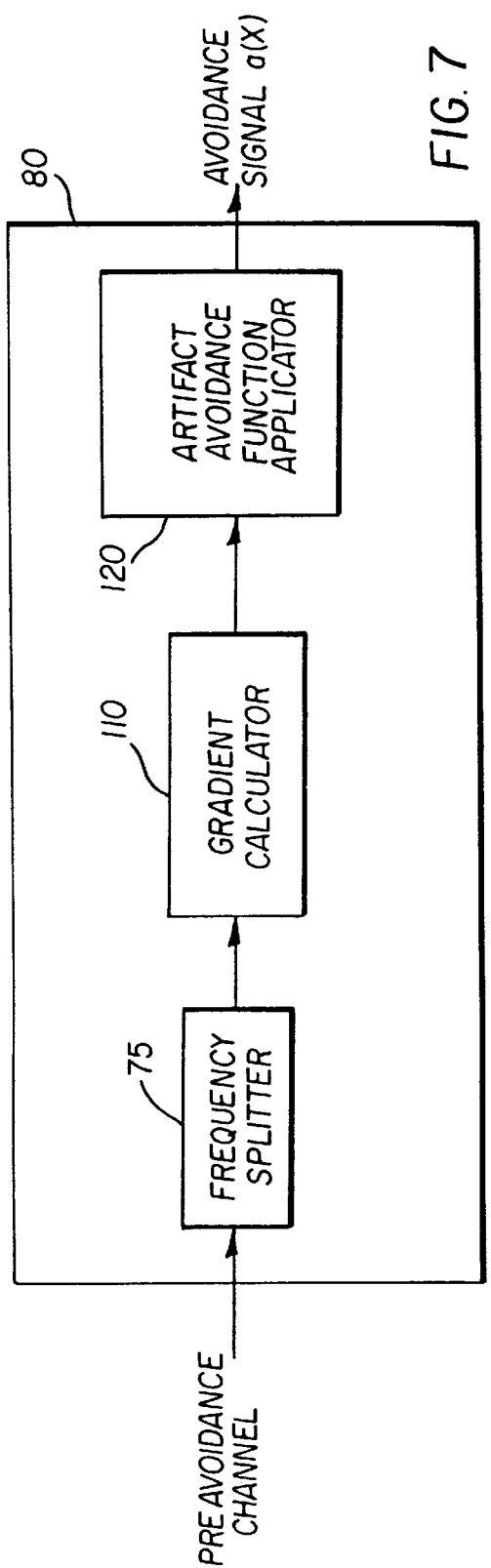
FIG. 7 is a block diagram of an avoidance signal generator.
Figure 8:
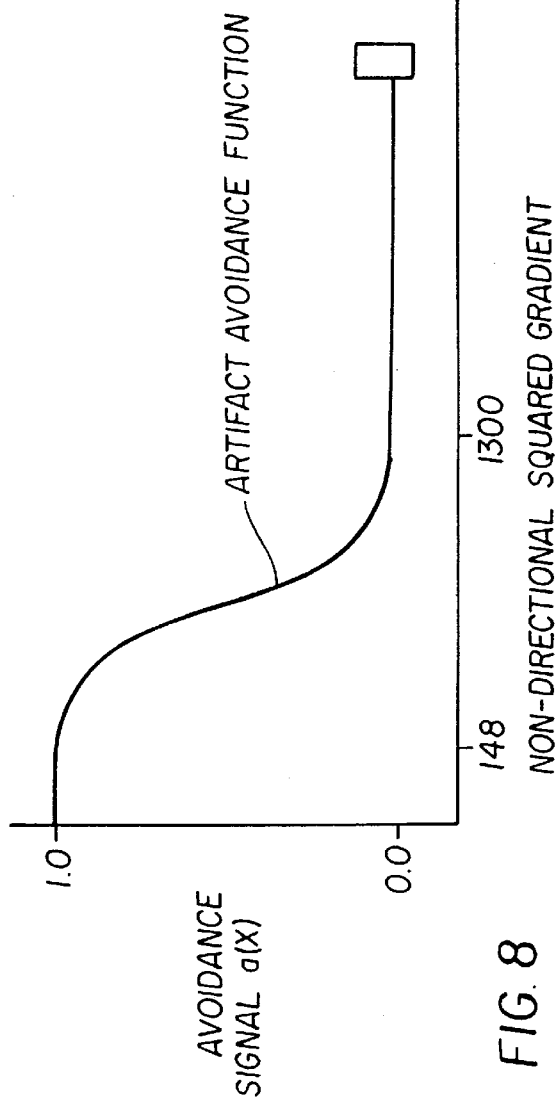
FIG. 8 is an illustration of an artifact avoidance LUT.

Referring to FIG. 7, there is illustrated an exploded block diagram of the avoidance signal generator 80. In this regard, the pre-avoidance channel is input into a frequency splitter 75 in order to generate a lowpass signal; the operation of a frequency splitter is described above. In the preferred embodiment, the standard deviation of the spatial filter used in this frequency splitter 75 is equal to the standard deviation of the spatial filter of the frequency splitter 70 (2.5 pixels). However, those skilled in the art will recognize that this condition is not a requirement. The lowpass signal output from the frequency splitter 75 is input to the non-directional squared gradient calculator 110 for producing a non-directional squared gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal is then mapped by an artifact avoidance function applicator 120 to produce an artifact avoidance signal.

Figure 9:
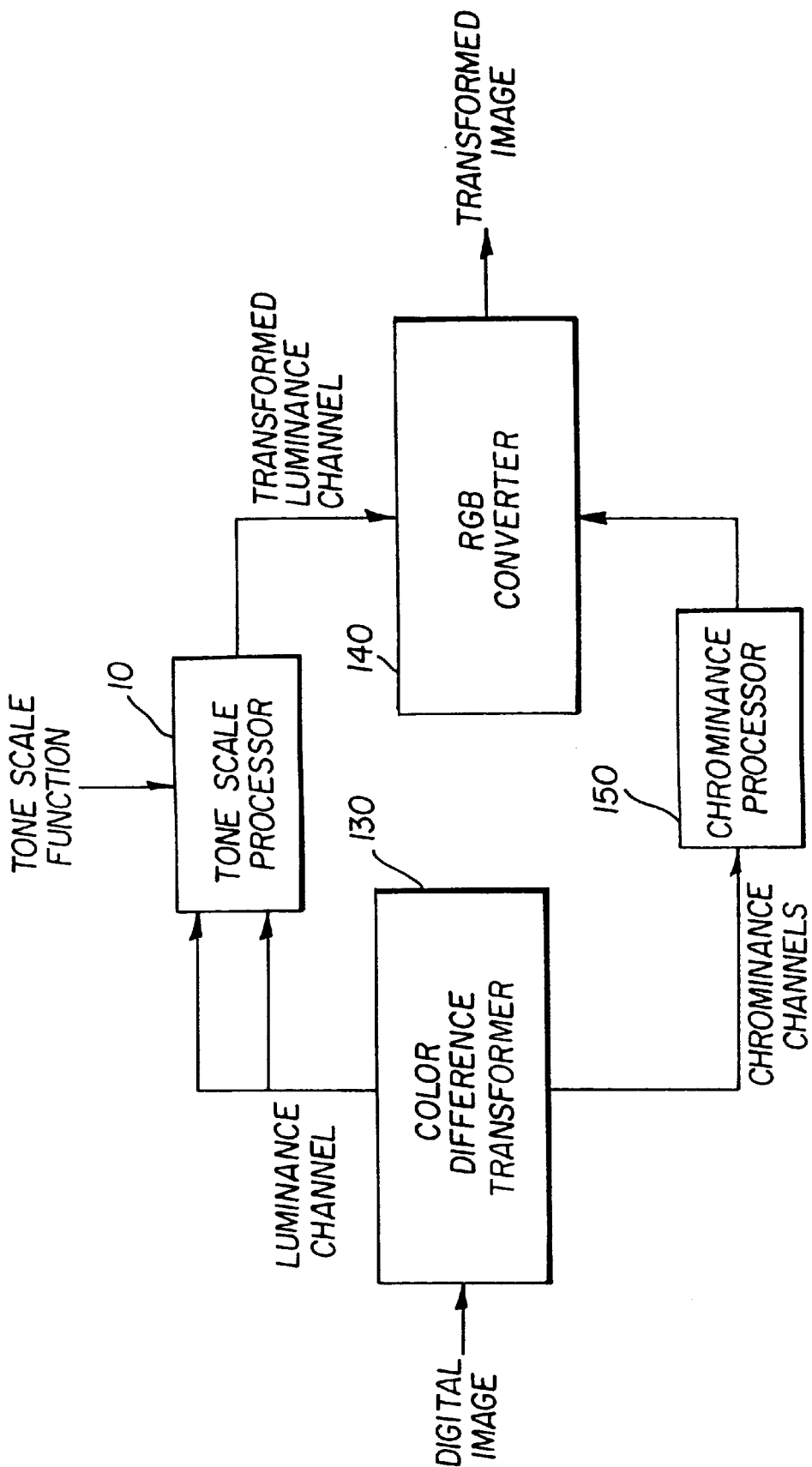
FIG. 9 is a block diagram illustrating an alternative embodiment of FIG. 2 in a luminance tone scale modification scheme.

Referring to FIG. 9, this mapping function is performed by passing the non-directional squared gradient value through a look-up-table (LUT) formed in the following manner. For non-directional squared gradient values less than or equal to constant k1, then artifact avoidance signal returned is 1.0. For non-directional squared gradient values greater than k1 but less than k2, the artifact avoidance signal returned is equal to:

$$1/2 * (1 + \cos(\pi * (\text{non-directional squared gradient} - k1)/(k2 - k1))).$$

For non-directional squared gradient values greater than k2, the artifact avoidance signal returned by the LUT is equal to 0.0. The constants k1 and k2 are preferable 148 and 1300, respectively. The values of the constants k1 and k2 are dependent upon the data range of the input digital image channel. In the preferred embodiment, the each pixel of the input digital image channel is described by 12 bits (i.e. 0–4095). In the preferred Alternatively, this mapping function may be performed by mapping the non-directional squared gradient value through any monotonically decreasing LUT ranging from 1.0 to 0.0 with increasing non-directional squared gradient.

Mathematics

The final processed pixel of the preferred embodiment may also be represented in functional form:

$$t(x) = x + a(x)g(f(x) - x) + (1 - a(x))(f(x) - x)$$

Where:

$t(x)$ = pixel of the transformed digital image channel $g(x)$ = a lowpass filter applied to signal x $f(x)$ = a tone scale function applied to signal x x = the original signal $a(x)$ = the artifact avoidance signal (the control signal)

The artifact avoidance signal $a(x)$ is 1 for pixels in regions of the image, which are generally, flat (i.e. regions of the image where U.S. Pat. No. 5,012,333 does not produce artifacts.) The signal $a(x)$ becomes 0 for pixels in regions of the image that contain high transition edges (i.e. regions of the image where U.S. Pat. No. 5,012,333 produces artifacts.) The signal $a(x)$ may take on any value within the range of 0.0 to 1.0 depending upon the structure of the local region of the image.

At this point, it becomes useful to make an approximation. With the nearly linear tone scale functions which are common to image processing, $$g(f(x)) = f(g(x)), \tag{2}$$

approximately.

The operation of applying an FIR filter (as applied by the frequency splitter 70) is a linear operation. Thus:

$$g(a(x) + b(x)) = g(a(x)) + g(b(x))$$

Thus, if the equation summarizing the preferred embodiment is evaluated with the approximation, and keeping in mind that the operation of applying an FIR filter (as applied by the frequency splitter 70) is a linear operation, the resulting approximation for the output pixel value in relatively flat regions ($a(x)=1$) becomes:

$$t(x)=f(g(x))+h(x)$$

where h(x)=a highpass filter applied to signal x (i.e. h(x)=x−g(x)), f(x)=a tone scale function applied to signal x, and x=the original signal.

This result implies that in relatively flat regions of the image, the detail signal of the processed pixel is equal to the detail signal of the original (h(x)), but the contrast of the lowpass image (g(x)) has been modified by f(x). Likewise, when the equation is simplified with the assumption that the pixel to be processed is near a high transition edge (a(x)=0), $$t(x)=f(x)$$

This result implies that the processed version of the original pixels is only a function of the original pixel values and the tone scale function in regions near high transition edges. This result prevents the occurrence of artifacts at the edge regions.

For pixels with an intermediate value of a(x), (0<a(x)<1), the processed pixel will be bounded by f(x) and f(g(x))+h(x).

In summary, the method of the current invention allows a tone scale function to be applied to an image in such a way that the detail from the original image is preserved, except in those regions where preservation of the detail would produce unnatural artifacts. In these regions, the tone scale is applied to the original pixel to produce the final output pixel.

Many other flow diagrams may be constructed which will produce a result that, when evaluated with the approximation, will be:

$$t(x) = f(g(x)) + h(x) \text{ for } (a(x) = 1)$$
$$t(x) = f(x) \text{ for } (a(x) = 0)$$

These alternative flow diagrams may appear quite different from the one described by the preferred embodiment, but utilize the same components of an avoidance signal, frequency decomposition by spatial filtering, and a tone scale function. The images processed with these various methods often contain small numerical differences (because of the approximations), but produce results that are visually comparable.

Referring to FIG. 9, an alternative embodiment of the present invention is illustrated showing the implementation of the present invention on the luminance channel derived from the digital image. The digital image is passed as the input to a color difference transformer 130. The computation of the color difference signals by the color difference transformer 130 may be performed by a matrix operation. For example, in the preferred embodiment, a luminance signal and two color difference signals may be determined for each pixel of the input image by the following matrix transform:

$$\begin{bmatrix} \frac{1}{3} & \frac{1}{3} & \frac{1}{3} \\ -\frac{1}{4} & \frac{1}{2} & -\frac{1}{4} \\ -\frac{1}{2} & 0 & \frac{1}{2} \end{bmatrix} \begin{bmatrix} R \\ G \\ B \end{bmatrix} = \begin{bmatrix} L \\ C_1 \\ C_2 \end{bmatrix}$$

where:
R,G, and represent the original red, green, and blue intensities at a particular pixel.
L represents the luminance signal
$C_1$, $C_2$ represent the color difference signals The luminance channel L output from the color difference transformer 130 is then passed to the tone scale processor 10. For this embodiment, the pre-avoidance channel is made equal to the digital image channel input to the tone scale processor 10 (i.e. the image avoidance channel is set equal to the luminance channel L.) Those skilled in the art will recognize that the pre-avoidance channel need not be equal to the luminance channel, for instance, the pre-avoidance channel may be equal to the green channel of the digital image.

The operation of the tone scale processor 10 on the input luminance channel is the same as that described in the preferred embodiment of the present invention.

The chrominance channels $C_1$ and $C_2$ output from the color difference transformer 130 are passed to the chrominance processor 150 in order to generate modified chrominance channels. In the preferred embodiment, the processed chrominance channels $C_{p1}$ and $C_{p2}$ output from the chrominance processor 150 are equal to the input chrominance channels $C_1$ and $C_2$.

The transformed luminance channel output from the tone scale processor 10 is then input to the RGB Converter 140. In addition, the processed chrominance channels $C_{p1}$ and $C_{p2}$ output from the chrominance processor 150 are input to the RGB converter 140. The RGB converter 140 transforms the input luminance channel and chrominance channels by multiplication with a matrix. The matrix used is the inverse of the matrix used by the color difference transformer 130. Multiplication by a matrix and generation of an inverse matrix is well known, and will not be further discussed.

What is claimed is:

1. A method for adjusting tone scale of a digital image, the method comprising the step of:
   (a) receiving a digital image channel from the digital image;
   (b) providing a tone scale function for adjusting the tone scale of the digital image channel;
   (c) calculating a difference signal derived from the digital image channel and the tone scale function;
   (d) calculating a compensation signal derived from a filtered version of the difference signal; and,
   (e) combining the digital image channel and the compensation signal to generate a modified digital image channel.

2. The method as in claim 1 wherein step (d) further comprises of the steps of (d1) providing a control signal and (d2) using the control signal and a spatial filter for assisting in the generation of the compensation signal.

3. The method as in claim 2 wherein step (d1) further comprises creating the control signal from a spatially filtered version of the digital image channel.

4. The method as in claim 2 wherein step (d1) further comprises the steps of (d1a) providing additional digital image channels from the digital image; (d1b) generating a combination signal derived from the digital image channel and the additional digital image channels; and (d1c) creating the control signal from a spatially filtered version of the combination signal.

5. The method of claim 1, wherein step (a) includes receiving a luminance channel as the digital image channel.

6. The method of claim 2, wherein step (a) includes receiving a luminance channel as the digital image channel.

7. The method of claim 3, wherein step (a) includes receiving a luminance channel as the digital image channel.

8. The method of claim 4, wherein step (a) includes receiving a luminance channel as the digital image channel.

9. The method of claim 1, wherein step (a) includes receiving either a red, green or blue channel as the digital image channel.

10. The method of claim 2, wherein step (a) includes receiving either a red, green or blue channel as the digital image channel.

11. The method of claim 3, wherein step (a) includes receiving either a red, green or blue channel as the digital image channel.

12. The method of claim 4, wherein step (a) includes receiving either a red, green or blue channel as the digital image channel.

13. The method as in claim 1 wherein step (c) further comprises the step of (c1) applying the tone scale function to the digital image channel for forming a tone scaled signal; and (c2) calculating the difference signal by subtracting the digital image channel from the tone scaled signal.

14. The method as in claim 1 wherein step (c) further comprises the step of (c1) generating a difference function derived from the tone scale function; and (c2) calculating the difference signal by applying the difference function to the digital image channel.

15. A system for adjusting tone scale of a digital image, the system comprising:
   (a) means for receiving a digital image channel from the digital image;
   (b) means for providing a tone scale function for adjusting the tone scale of the digital image channel;
   (c) means for calculating a difference signal derived from the digital image channel and the tone scale function;
   (d) means for calculating a compensation signal derived from a filtered version of the difference signal; and,
   (e) means for combining the digital image channel and the compensation signal to generate a modified digital image channel.

16. The system as in claim 15 wherein (d) the calculation the compensation signal means further comprises (d1) means for providing a control signal and (d2) means for using the control signal and a spatial filter for assisting in the generation of the compensation signal.

17. The system as in claim 16 wherein (d1) the control signal means further comprises mean for creating the control signal from a spatially filtered version of the digital image channel.

18. The system as in claim 16 wherein d1) the control signal means further comprises (d1a) means for providing additional digital image channels from the digital image; (d1b) means for generating a combination signal derived from the digital image channel and the additional digital image channels; and (d1c) means for creating the control signal from a spatially filtered version of the combination signal.

19. The system of claim 15, wherein (a) the receiving means includes means for receiving a luminance channel as the digital image channel.

20. The system of claim 16, wherein (a) the receiving means includes receiving a luminance channel as the digital image channel.

21. The system of claim 17, wherein (a) the receiving means includes means for receiving a luminance channel as the digital image channel.

22. The system of claim 18, wherein (a) the receiving includes receiving a luminance channel as the digital image channel.

23. The system of claim 15, wherein (a) the receiving means includes receiving either a red, green or blue channel as the digital image channel.

24. The system of claim 16, wherein (a) the receiving means includes receiving either a red, green or blue channel as the digital image channel.

25. The system of claim 17, wherein (a) the receiving means includes receiving either a red, green or blue channel as the digital image channel.

26. The system of claim 18, wherein (a) the receiving means includes means for receiving either a red, green or blue channel as the digital image channel.

27. The system as in claim 15 wherein step (c) further comprises the step of (c1) applying the tone scale function to the digital image channel for forming a tone scaled signal; and (c2) calculating the difference signal by subtracting the digital image channel from the tone scaled signal.

28. The system as in claim 15 wherein step (c) further comprises the step of (c1) generating a difference function derived from the tone scale function; and (c2) calculating the difference signal by applying the difference function to the digital image channel.

29. A computer program product for adjusting tone scale of a digital image, comprising: a computer readable storage medium having a computer program stored thereon for performing the steps of:
   (a) receiving a digital image channel from the digital image;
   (b) providing a tone scale function for adjusting the tone scale of the digital image channel;
   (c) calculating a difference signal derived from the digital image channel and the tone scale function;
   (d) calculating a compensation signal derived from a filtered version of the difference signal; and,
   (e) combining the digital image channel and the compensation signal to generate a modified digital image channel.

30. The computer program product as in claim 29 wherein step (d) further comprises of the steps of (d1) providing a control signal and (d2) using the control signal and a spatial filter for assisting in the generation of the compensation signal.

31. The computer program product as in claim 30 wherein step (d1) further comprises creating the control signal from a spatially filtered version of the digital image channel.

32. The computer program product as in claim 30 wherein step (d1) further comprises the steps of (d1a) providing additional digital image channels from the digital image; (d1b) generating a combination signal derived from the digital image channel and the additional digital image channels; and (d1c) creating the control signal from a spatially filtered version of the combination signal.

33. The computer program product of claim 29, wherein step (a) includes receiving a luminance channel as the digital image channel.

34. The computer program product of claim 30, wherein step (a) includes receiving a luminance channel as the digital image channel.

35. The computer program product of claim 31, wherein step (a) includes receiving a luminance channel as the digital image channel.

36. The computer program product of claim 32, wherein step (a) includes receiving a luminance channel as the digital image channel.

37. The computer program product of claim 29, wherein step (a) includes receiving either a red, green or blue channel as the digital image channel.

38. The computer program product of claim 30, wherein step (a) includes receiving either a red, green or blue channel as the digital image channel.

39. The computer program product of claim 31, wherein step (a) includes receiving either a red, green or blue channel as the digital image channel.

40. The computer program product of claim 32, wherein step (a) includes receiving either a red, green or blue channel as the digital image channel.

41. The computer program product as in claim 29 wherein step (c) further comprises the step of (c1) applying the tone scale function to the digital image channel for forming a tone scaled signal; and (c2) calculating the difference signal by subtracting the digital image channel from the tone scaled signal.

42. The computer program product as in claim 29 wherein step (c) further comprises the step of (c1) generating a difference function derived from the tone scale function; and (c2) calculating the difference signal by applying the difference function to the digital image channel.

\* \* \* \* \*